United States Patent [19]

Imamura

[11] Patent Number: 5,549,093
[45] Date of Patent: Aug. 27, 1996

[54] TRACTION CONTROL FOR AUTOMOTIVE VEHICLE

[75] Inventor: Masamichi Imamura, Atsugi, Japan

[73] Assignee: Unisia Jecs Corporation, Atsugi, Japan

[21] Appl. No.: 365,146

[22] Filed: Dec. 28, 1994

[30] Foreign Application Priority Data

Dec. 28, 1993 [JP] Japan ................. 5-070531 U

[51] Int. Cl.⁶ ............... F02D 41/04; F02D 17/02; B60K 28/16
[52] U.S. Cl. ............... 123/481; 123/198 F; 180/197
[58] Field of Search ............... 123/415, 416, 123/417, 418, 422, 423, 478, 481, 198 DB, 198 F, 333; 180/197

[56] References Cited

U.S. PATENT DOCUMENTS

| | | | |
|---|---|---|---|
| 4,736,814 | 4/1988 | Yogo et al. | 123/198 DB |
| 4,860,847 | 8/1989 | Shiraishi et al. | 123/481 |
| 4,951,773 | 8/1990 | Poirier et al. | 123/481 |
| 5,099,942 | 3/1992 | Kushi et al. | 123/481 |
| 5,213,178 | 5/1993 | Polidan et al. | 123/417 |
| 5,283,742 | 2/1994 | Wazaki et al. | 123/333 |

FOREIGN PATENT DOCUMENTS 2-233855  9/1990  Japan.

OTHER PUBLICATIONS

"Nissan Bluebird, Introduction to Model of the U13 Type", Nissan Motor Co. Ltd., Aug., 1993.

Primary Examiner—Willis R. Wolfe
Attorney, Agent, or Firm—Foley & Lardner

[57] ABSTRACT

An engine shifts to a split cylinder operation to reduce a wheel slip of driving wheels of an automotive vehicle. The split cylinder operation is effected on mixture free from mixture enrichment correction and during the split cylinder operation, each of the engine cylinders is disabled at intervals. Thus, the cylinder heat is distributed evenly over the whole engine cylinders during the split cylinder operation.

11 Claims, 5 Drawing Sheets

5,549,093

1

TRACTION CONTROL FOR AUTOMOTIVE VEHICLE

BACKGROUND OF THE INVENTION

The present invention relates to a traction control for automotive vehicles, and more particularly to a method of and a system for controlling a wheel slip at acceleration.

JP-A 2-233855 discloses a traction control wherein an engine performs a split cylinder operation on lean mixture to control the engine torque. According to this known control, the split cylinder operation is performed on lean mixture, i.e., a mixture with a predetermined air fuel ratio greater than the stoichiometry, even when the temperature of engine cylinders is elevated greatly due to engine operation on rich mixture during warm-up operation at very low ambient temperature or during operation at high speed with high or heavy load. Supply of oxygen rich lean mixture to each of the heated engine cylinders results in a rapid increase of combustion temperature, creating heat spot within the combustion chamber and thus inducing occurrence of knock. The combustion at increased temperature results in exhaust gas with excessively high temperature.

An object of the present invention is to improve a traction control of the above type such that a split cylinder operation is performed without occurrence of knock and without excessive increase in exhaust gas temperature.

SUMMARY OF THE INVENTION

In order to accomplish the object, the present invention proposes a method of and a system for a traction control for an automotive vehicle wherein an engine effects a split cylinder operation at or in the vicinity of the stoichiometry in such a manner that each of the engine cylinders is disabled at intervals during the split cylinder operation.

According to one aspect of the present invention, there is provided a method of a traction control for an automotive vehicle having a multi-cylinder internal combustion engine, a pair of driving wheels driven by the engine, and a pair of non-driving wheels, wherein the engine shifts to effect a split cylinder operation in response to occurrence of a wheel slip of the driving wheels, and wherein the mixture on which the engine operates is subject to mixture enrichment. The method operates such that, during the split cylinder operation, each of the engine cylinders is disabled at intervals and the split cylinder operation is effected on mixture which is free from the mixture enrichment.

According to another aspect of the present invention, there is provided a system for a traction control for an automotive vehicle having a multi-cylinder internal combustion engine, a pair of driving wheels driven by the engine, and a pair of non-driving wheels, wherein the engine shifts to effect a split cylinder operation in response to occurrence of a wheel slip of the driving wheels, and wherein the mixture on which the engine operates is subject to mixture enrichment. The system operates such that, during the split cylinder operation, each of the engine cylinders is disabled at intervals and the split cylinder operation is effected on mixture which is free from the mixture enrichment.

2

Figure 2:
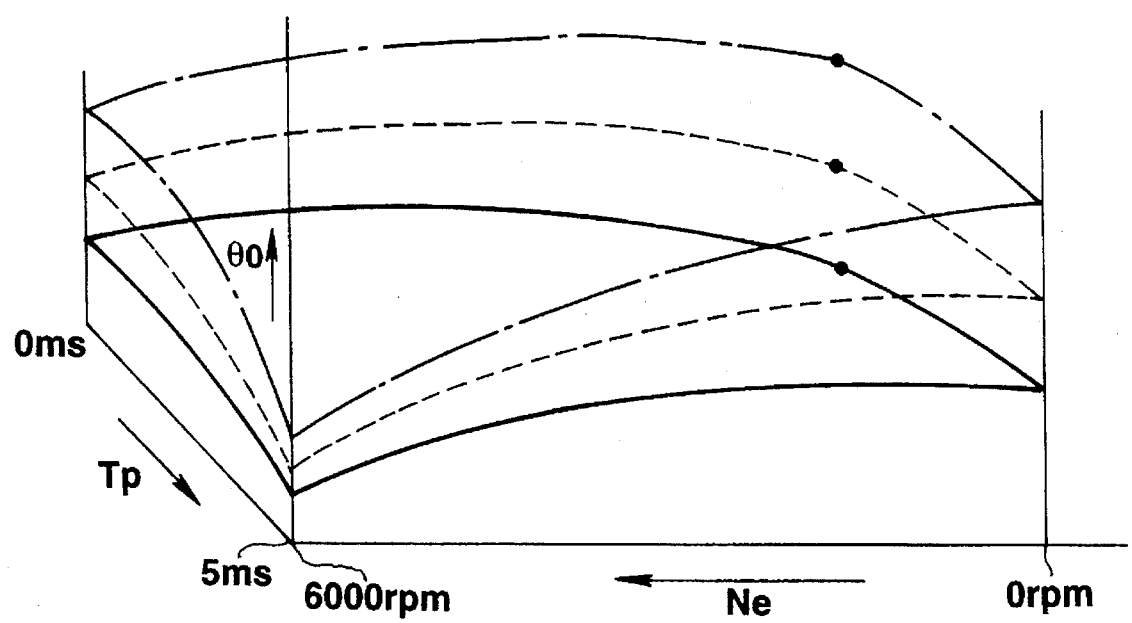
Figure 3:
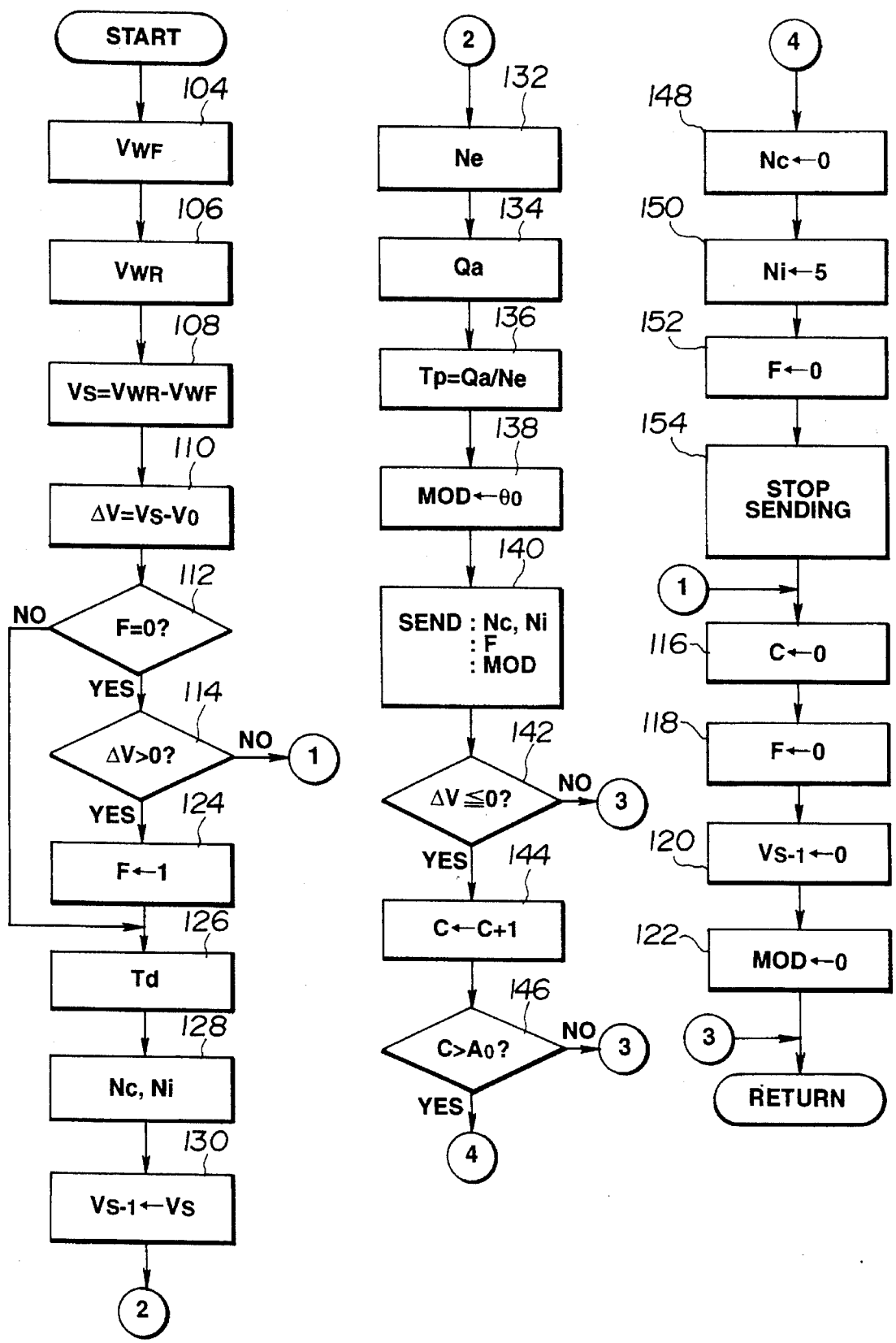
Figure 4:
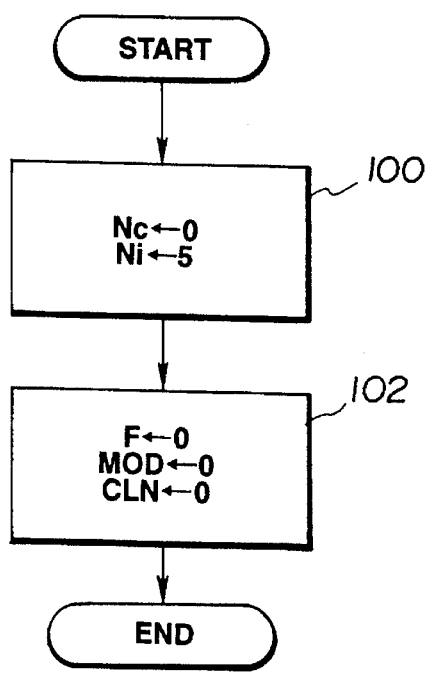
Figure 5:
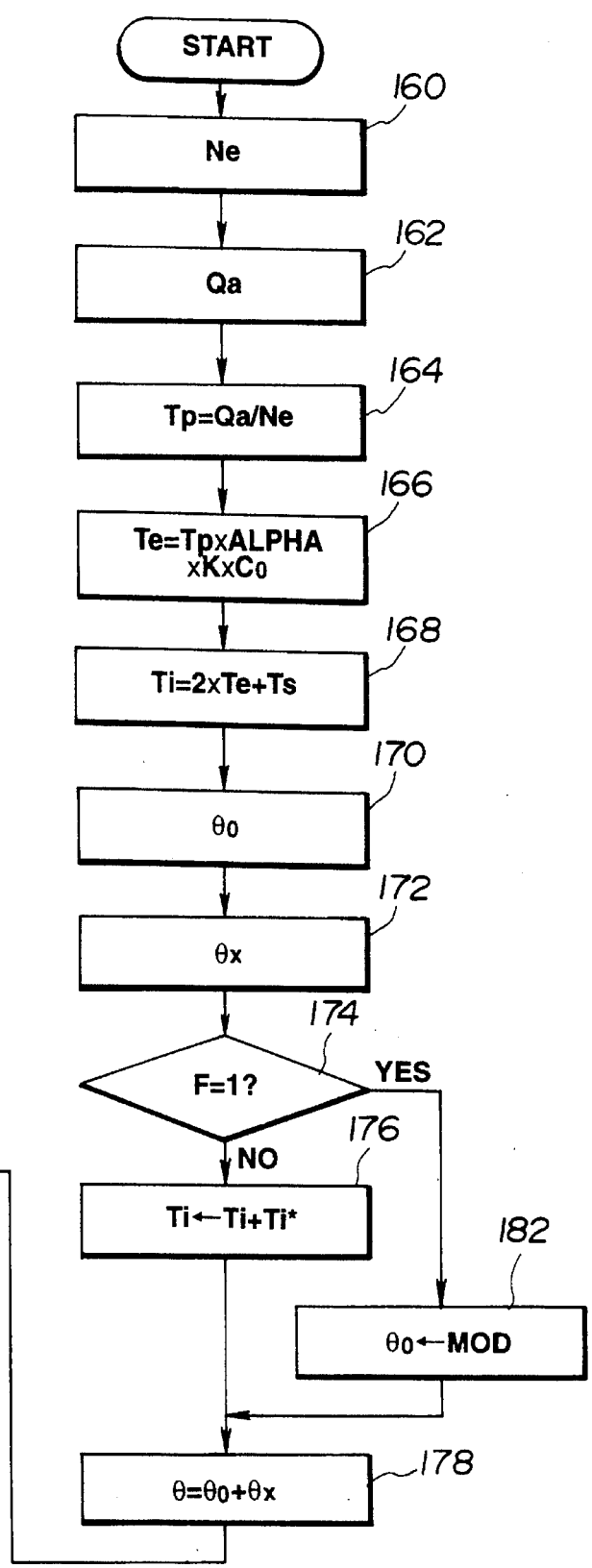
Figure 6:
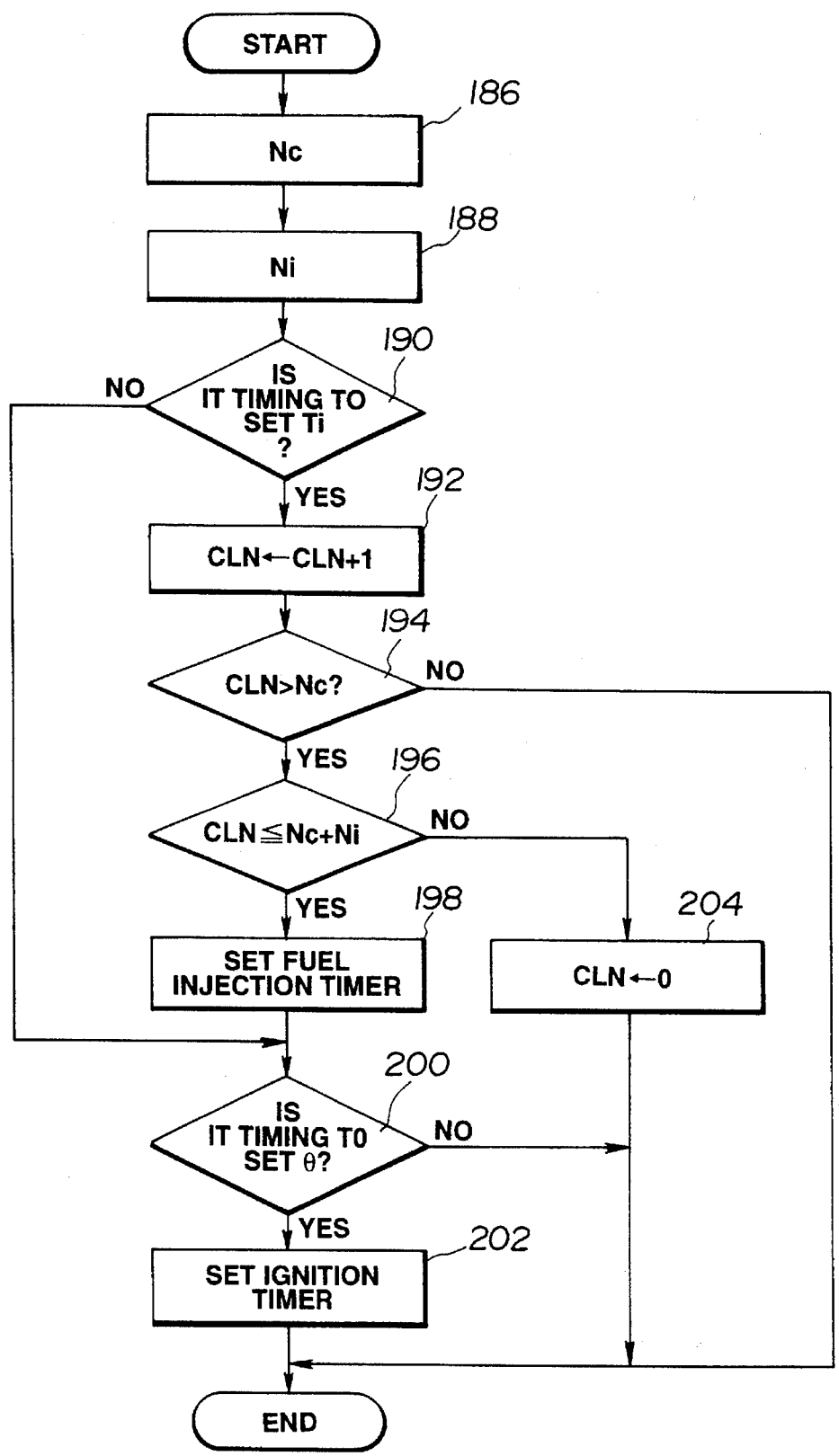

FIG. 2 illustrates advance map used to give a base advance of an ignition timing;

FIG. 3 is a flow chart of a traction control routine performed in a traction control unit;

FIG. 4 is a flow chart of an initializing routine performed in an engine control unit;

FIG. 5 is a flow chart of an injection pulse width and ignition timing advance or retard control routine performed in the engine control unit; and FIG. 6 is a flow chart of a fuel injection and ignition timing control routine performed in the engine control unit.

DETAILED DESCRIPTION OF THE INVENTION

Figure 1:
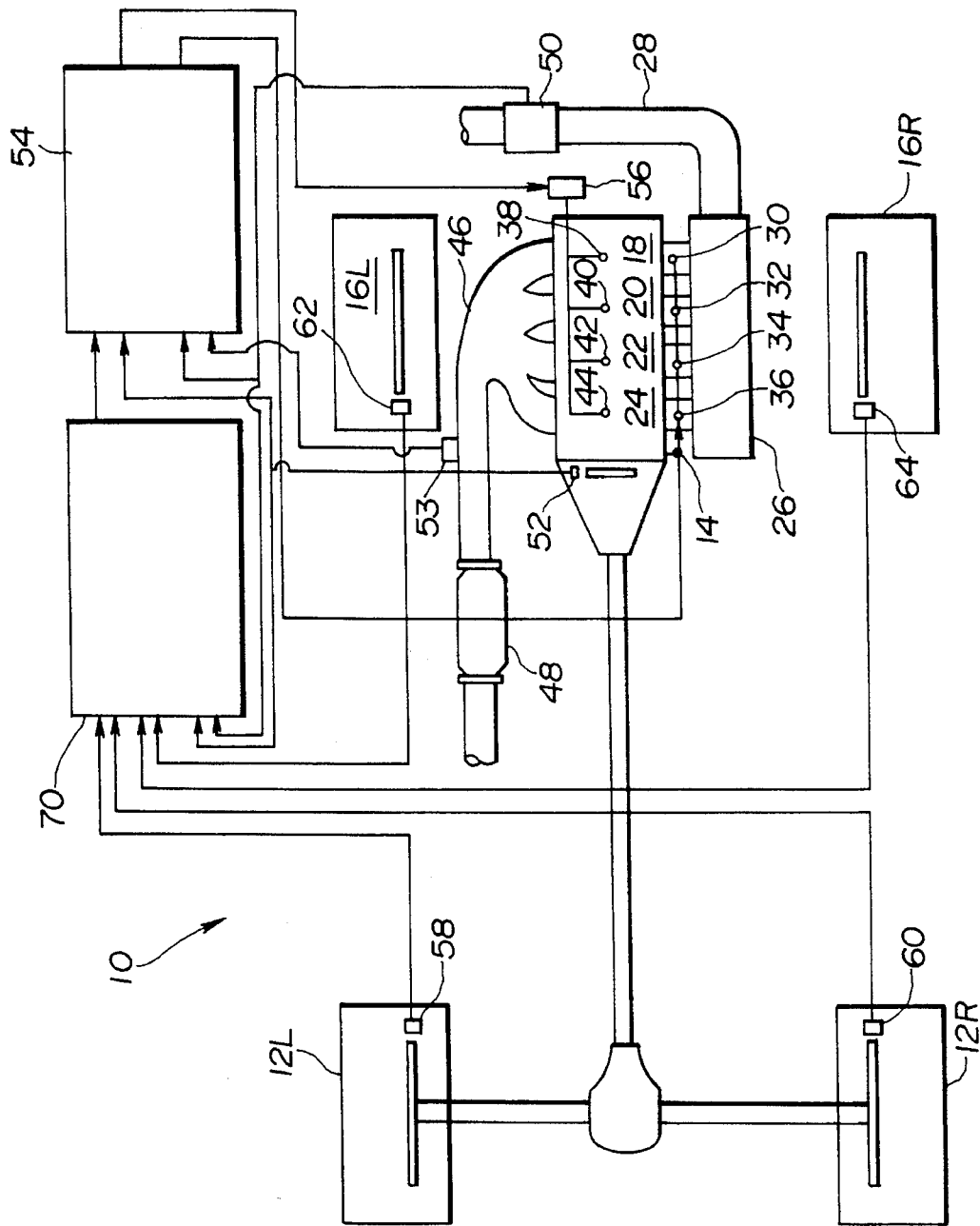
FIG. 1 is a block diagram of an automotive vehicle installed with a traction control system.

Referring to FIG. 1, an automotive vehicle 10 has a pair of rear driving wheels 12L and 12R driven by a multi-cylinder internal combustion engine 14 and a pair of front non-driving wheels 16L and 16R. The internal combustion engine 14 has a plurality, four in this embodiment, of cylinders 18, 20, 22 and 24. Intake air is supplied to the cylinders 18, 20, 22 and 24 via an intake system 26 including an induction passage 28. Fuel is supplied to the cylinders 18, 20, 22 and 24 via fuel injectors 30, 32, 34 and 36. The fuel injectors 30, 32, 34 and 36 are arranged to direct jets of fuel to the corresponding cylinders 18, 20, 22 and 24, respectively. Combustible mixture is formed within each of the cylinders 18, 20, 22 and 24. Combustion within each of the cylinders 18, 20, 22 and 24 is initiated by spark produced by the corresponding one of spark plugs 38, 40, 42 and 44 provided for the cylinders 18, 20, 22 and 24, respectively. Exhaust gas resulting from the combustion is discharged into an exhaust system 46 including an exhaust gas purifier in the form of a three-way catalytic converter 48.

An air flow meter 50 is provided to detect a flow rate of air passing through the induction passage 28 and to generate an air flow rate indicative signal indicative of the detected flow rate. A crankshaft angle sensor 52 is provided to detect an angular position of a crankshaft of the engine 10 and to generate crankshaft angle indicative signals, namely, a reference (REF) signal generated at 180 degrees intervals and a position (POS) signal generated at 1 degree intervals. An oxygen ($O_2$) sensor 53 is mounted to the exhaust system 46.

The air flow rate indicative signal of the air flow meter 50, REF and POS signals of the crankshaft angle sensor 52 and the output of the $O_2$ sensor 53 are fed to an engine control unit 54.

The engine control unit 54 determines an engine revolution speed Ne out of the REF signal from the crankshaft angle sensor 52 and determines an intake air flow rate Qa out of the air flow rate indicative signal from the air flow meter 50. Based on the information, the control unit 54 calculates Qa/Ne to give a base fuel injection amount Tp which is variable with engine speed and load. Using this base fuel injection amount Tp, an ordinary fuel injection amount Ti supplied usually to each of the cylinders is determined in a manner described in Service Manual (U13-2) entitled "NISSAN BLUEBIRD, INTRODUCTION TO MODEL OF THE U13 TYPE" published in August, 1993 by Nissan Motor Co. Ltd. Particular attention is to be paid to description and illustration of a double overhead cam (DOHC) electronic fuel injection (EGI) four-cylinder engine of the KA24DE type on pages B-1, B-2, B-9, B-19 to B-42 and to description and illustration of a fuel injection control system on pages B-43 to B-46 and also to description and illustration of an ignition timing control system on pages B-47 to B-49.

Briefly, there is explained the manner of determining the final fuel injection amount Ti which can be expressed by the following equation:

$$Ti = 2 \times Te + Ts \qquad \text{Eq. 1}$$

where:

Te represents an effective fuel injection amount; and

Ts represents a compensation amount for a delay of fuel injector owing to a drop in output voltage of vehicle battery.

The effective fuel injection amount Te can be expressed by the following equation:

$$Te = Tp \times ALPHA \times K \times Co \qquad \text{Eq. 2}$$

where:

ALPHA represents a coefficient for air fuel ratio feedback;

K represents a coefficient derived from air fuel ratio learning; and

Co represents various correction coefficients.

The various correction coefficients Co can be expressed by the following equation:

$$Co = (K_{MR} + K_{TRM} + K_{TW} + K_{AS} + K_F - K_{DC}) \times K_{ST} \qquad \text{Eq. 3}$$

where:

$K_{MR}$, $K_{TRM}$ represent air fuel ratio correction coefficients to provide an appropriate air fuel ratio for engine revolution speed and base fuel injection amount. With these correction coefficients, the fuel injection amount to be increased becomes the greatest during operation at high speed with high load.

$K_{TW}$ represents a coolent temperature correction coefficient variable with engine coolant temperature and engine speed. With this correction coefficient, the fuel injection amount to be increased becomes great as engine coolant temperature becomes low.

$K_{AS}$ represents a cranking follow-up correction coefficient which starts to decrease after cranking operation and then decreases at a predetermined rate to zero. With this correction coefficient, the fuel injection amount to be added becomes great as the engine coolant temperature upon cranking operation becomes low.

$K_F$ represents a low coolant temperature correction coefficient. With this correction coefficient, the fuel injection amount to be increased is variable with a speed at which throttle opening degree varies, coolant temperature and engine speed. This correction coefficient decreases at a predetermined rate to zero.

$K_{DC}$ represents a deceleration correction coefficient. With this correction coefficient, the fuel injection amount is decreased.

$K_{ST}$ represents a cranking correction coefficient which is increased when an ignition key is placed at "START" position.

At acceleration, in addition to the ordinary fuel injection amount, a predetermined amount of fuel is injected to each of the cylinders to improve acceleration performance.

Usually, based on the output signal of the $O_2$ sensor 53, the fuel injection amount is varied to adjust the air fuel ratio to a predetermined window around the stoichiometry. This closed loop control based on the output of the $O_2$ sensor 53 is suspended during cranking, operation at low coolant temperature, operation at high load, operation at deceleration, and idle operation. Thus, the fuel injection amount is increased to form a rich mixture having an air fuel ratio less than the stoichiometry during warming up operation at low coolant temperature and during operation with the high load. This mixture enrichment correction is performed as long as traction with road is maintained.

Pulse width of the fuel injection pulse supplied to each of the fuel injectors 30, 32, 34 and 36 represents the fuel injection amount determined as discussed above. Injection timing via each of the fuel injectors 30, 32, 34 and 36 is determined based on the REF and POS signals.

Ignition or spark timing is controlled via an ignition coil 56 by the control unit 54. Ordinarily, spark advance θ is the sum of a base advance θo and a knocking correction θx. Various values of the base advance θo are allocated in an advance map against varying values of engine revolution speed Ne and base fuel injection amount Tp that represents the engine load. The advance map is illustrated by one-dot chain line in FIG. 2. Based on output of knock sensors, not shown, mounted to the cylinders, the knocking correction θx takes different values such that when there is no occurrence of knock, the knocking correction θx causes the ordinary advance to yield a spark advance, while upon occurrence of knock, the knocking correction θx causes the ordinary advance θx to yield a spark retard.

The engine control unit 45 used in this embodiment is substantially the same as an engine control unit employed to control the engine of the KA24DE type.

In order to carry out the traction control, wheel speed sensors 58, 60, 62 and 64 are mounted to detect wheel revolution speeds of the driving and non-driving wheels 12L, 12R, 16L and 16R, respectively. Wheel speed indicative signals generated by these sensors 58, 60, 62 and 64 are supplied to a traction control unit 70. Also supplied to the traction control unit 70 are the air flow rate indicative signal from the air flow meter 50 and the REF and POS signals from the crankshaft angle sensor 52.

The traction control unit 70 is operative to compare wheel speeds of the non-driving front wheels 16L and 16R with each other to give a larger one of them as a front wheel speed $V_{WF}$, and compare wheel speeds of the driving rear wheels 12L and 12R with each other to give a larger one of them as a rear wheel speed $V_{WR}$. Based on the front and rear wheel speeds $V_{WF}$ and $V_{WR}$, a wheel slip at acceleration $V_S$ as expressed by the following equation is given:

$$V_S = V_{WR} - V_{WF} \qquad \text{Eq. 4.}$$

Then, the amount (delta V) of wheel slip at acceleration $V_S$ is given by the following equation:

$$Delta\ V = V_S - V_0 \qquad \text{Eq. 5.}$$

where: $V_0$ is a value defining a limit of an allowable deviation from zero.

Let it be assumed that the engine 14 is in warming-up operation at low coolant temperature. Under this condition, if a driver depresses a gas pedal down to the floor quickly for rapid acceleration and delta V is less than or equal to zero, the control unit 54 performs the before-mentioned mixture enrichment correction, with the closed loop control based on the output of the $O_2$ sensor 53 suspended.

If, under this condition, delta V becomes greater than zero, the traction control unit 70 sends to the engine control unit 54 instructions that the engine shift to split cylinder operation and the mixture enrichment correction be suspended.

It is essential according to the present invention that, during split cylinder operation, each of the cylinders 18, 20, 22 and 24 is disabled at regular intervals and the mixture enrichment correction having been effected be suspended to reduce hydrocarbon (HC) and carbon monoxide (CO) within the cylinder or cylinders.

Specifically, the control unit 70 determines a desired drop in torque Td which can be expressed as:

$$Td = K_1 V_S + K_2 V_{S-1} + K_3 (V_S - V_{S-1}) \qquad \text{Eq. 6}$$

where:

$K_1$, $K_2$, $K_3$ are constants;

$V_{S-1}$ is an old value of $V_S$.

Then, split cylinder operation to be effected by the engine 14 is tailored for good fit to the determined desired drop in torque Td. The schedule of split cylinder operation can be defined by two variables, namely, a number Ni of times at which fuel injection is to be effected and a number Nc of times at which fuel injection is to be suspended. It is essential according to the present invention that the sum of Ni and Nc fails to agree with the total number of the cylinders 18, 20, 22 and 24 of the engine 14 and a divisor of this total, either.

In this embodiment, the sum of Ni and Nc is five (5) since the total number of the engine cylinders is four (4). In this case, the engine 14 may shift to split cylinder operation in one of five different schedules listed as below:

| Nc/(Ni + Nc) × 100% | 100% | 80% | 60% | 40% | 20% |
|---|---|---|---|---|---|
| Ni | 0 | 1 | 2 | 3 | 4 |
| Nc | 5 | 4 | 3 | 2 | 1 |

In accordance with a predetermined rule, one of the five different schedules is selected for the desired drop in torque Td.

In order to avoid occurrence of knock in the cylinder or cylinders during split cylinder operation, it is preferrable to retard the spark timing. FIG. 2 shows in the fully drawn line a map which is used when Nc/(Ni+Nc)×100% is 60%. In FIG. 2, the broken line shows a map which is used when Nc/(Ni+Nc)×100% is 30%. Assuming now that the split cylinder operation with Ni=2 and Nc=3 is selected, the base advance θo is given by the map illustrated by the fully drawn line in FIG. 2. From FIG. 2, it will be appreciated that, with the same set of Ne and Tp, the base advance θo becomes small as Nc/(Ni+Nc) becomes great.

The flow charts of FIGS. 3, 4, 5 and 6 illustrate a traction control of the preferred implementation of the present invention. The flow charts of FIG. 3 illustrate a control routine which is executed in the traction control unit 70. The flow charts of FIGS. 4, 5 and 6 illustrate control routines which are executed in the engine control unit 54.

Upon or immediately after turning the ignition key to START position to initiate cranking of the engine 14, the routine of FIG. 4 is executed once. In box 100, the engine control unit 54 initializes numbers Nc and Ni by setting the number Nc to zero (0) and by setting the number Ni to five (5). In the next box, the control unit 54 initializes flag F, variable MOD and counter CLN by resetting F to zero (0), by setting MOD to zero (0) and resetting counter to zero (0).

The traction control unit 70 repeats execution of the control routine of FIG. 3 at regular intervals.

In boxes 104 and 106, the traction control unit 70 determines the front wheel speed $V_{WF}$ and rear wheel speed $V_{WR}$.

As mentioned before, a larger one of wheel speeds of the front wheels 16F and 16R is set to the front wheel speed $V_{WF}$ and a larger one of wheel speeds of the rear wheels 12F and 12R is set to the rear wheel speed $V_{WR}$. In box 108, the control unit 70 determines the wheel slip $V_S$ by computing the equation Eq. 4. In box 110, the control unit 70 determines the delta V by computing the equation Eq. 5. The control unit 70 determines in interrogation box 112 whether the flag F, namely traction control flag, is reset. Initially, this flag F is reset, so that the control unit 70 determines in interrogation box 114 whether the delta V is greater than zero (0). Assuming now that the delta V is not greater than zero (0), the control unit 70 then resets counter C to zero in box 116, resets flag F to zero in box 118, sets an old wheel slip $V_{S-1}$ to zero (0), and sets variable MOD to zero (0) in box 122. Then, the control unit 70 returns to the start point.

Let us now assume that the driving rear wheels 12F and 12R begin to slip immediately after the driver has depressed the gas pedal down to the floor.

In this case, if the wheel slip $V_S$ grows bigger than the value $V_0$, the control routine proceeds from block 114 to block 124 where the control unit 70 sets the traction control flag F to one (1). Then, the control unit 70 determines, in box 126, the drop in torque Td by computing the equation Eq. 6. Next, the control unit 70 determines, in box 128, the numbers Nc and Ni for good fit to the determined Td in accordance with the predetermined rule. Let us now assume that the control unit 70 sets Ni to two (2) and sets Nc to three (3). In this case, a torque reduction rate owing to split cylinder operation amounts to 60%. In box 130, the control unit 70 update the old wheel slip $V_{S-1}$, in box 130, by setting $V_{S-1}$ to the current wheel slip $V_S$.

The control routine then proceeds to boxes 132, 134, 136 and 138 to determine an appropriate value of base advance θo of the spark advance θ. The control unit 70 obtains engine revolution speed data Ne in box 132, and air flow rate data Qa in box 134. The control unit 70 next computes the base fuel injection amount Tp in box 136. In box 138, the control unit 70 performs a table look-up operation of the fully drawn map in FIG. 2 based on the data Ne and Tp to determine an appropriate base advance θo for the split cylinder operation characterized by the numbers Nc=3 and Ni=2 and sets the variable MOD to the determined base advance θo.

In the next block 140, the control unit 70 initiates sending the determined data Nc, Ni, P and MOD to the engine control unit 54. Sending operation is initiated by establishing data communication between the data Nc, Ni, F and MOD in control unit 70 and their counterparts in the engine control unit 54. Then, the control unit 70 determines in interrogation box 142 whether the delta V is less than or equal to zero (0). Since immediately after the delta V has become greater than zero, the interrogation in the box 142 results in negative so that the control unit 70 returns to the start point.

Owing to split cylinder operation of the engine 14, the delta V becomes small. If, subsequently, the delta V has decreased down to zero (0), the control routine proceeds from the interrogation box 142 to box 144. In box 144, the control unit 70 increases the counter C by one (1). This increment of counter C is carried out whenever the interrogation in box 142 results in affirmative. The control unit 70 determines in interrogation box 146 whether the content of counter C has exceeded a predetermined value Ao. As long as C is less than Ao, the control unit 70 returns to the start point.

If, subsequently, the interrogation in box 146 results in affirmative, the control unit 70 next sets Nc to zero (0) in box 148, sets Ni to five (5) in box 150 and resets F to zero (0) before data communication is closed. In next box 154, the control unit 70 stops sending data No, Ni, F and MOD to their counterparts in the engine control unit 54, closing the data communication.

The control unit 70 next performs jobs in boxes 116, 118, 120 and 122 before returning to the start point.

The execution of control routine of FIG. 5 is initiated by interruption determined on the POS and REF signals from the crankshaft angle sensor 52. In this embodiment, the execution of the control routine is repeated four times during two revolutions of the crankshaft of the engine 14.

The engine control unit 54 obtains engine revolution speed data Ne in box 160, air flow rate data Qa in box 162, computes base fuel injection amount Tp in box 166, computes effective fuel injection amount Te using the equation Eq. 2, and computes the final fuel injection amount Ti using the equation Eq. 1. The control unit 54 determines, in box 170, base advance θo after performing a table look-up operation of the advance map illustrated in one-dot chain line in FIG. 2. The control unit 54 then determines the knocking correction θx in box 172. There is interrogation in box 174 whether the traction control flag F is set. If the interrogation in box 174 results in negative, the control unit 54 determines the mixture enrichment correction Ti* and increases in box 176 the final fuel injection amount by Ti*. In this flow chart, in order to simplify the illustration, the symbol Ti* is used to represent fuel enrichment at acceleration or during warm-up operation. Thus, the symbol Ti* is normally zero when the closed loop control based on the output of oxygen sensor 53 is carried out, but becomes greater than zero during engine operation with heavy or high load when the closed loop control is suspended to allow enrichment of the mixture. After the box 176, the control unit 54 determines, in box 178, the spark advance θ as the sum of θo and θx. In box 180, the control unit 54 stores the final fuel injection amount Ti and spark advance θ in appropriate memory locations, respectively.

If the traction control flag F is set, the interrogation in box 174 results in affirmative. In this case, the control unit 54 does not perform the mixture enrichment correction. Thus, the mixture enrichment correction is suspended if it has been carried out. In box 182, the base advance θo is set to MOD which has been determined in box 138 of the control routine in FIG. 3. This means that the base advance determined using the advance map illustrated by the one-dot chain line in FIG. 2 has been replaced by the base advance determined using the advance map illustrated by the fully drawn line in FIG. 2. In other words, the base advance θo has reduced to a smaller value. The control unit 54, next determines the spark advance as the sum of the base advance θo obtained at box 182 and the knocking correction θx. Thus, the final injection amount Ti stored in box is free from the enrichment correction Ti* and the spark advance θ stored in box 180 gives a smaller advance retarded from the spark advance normally obtained if the traction control F is reset.

The execution of control routine of FIG. 6 is initiated by interruption determined on the POS and REF signals from the crankshaft angle sensor 52.

In box 186 and the next box 188, the engine control unit 54 obtains the numbers Nc and Ni which have been determined in box 128 of the control routine of FIG. 3. The control unit 54 determines in interrogation box 190 whether it is timing to set the final fuel injection amount Ti. If this is the case, the control unit next increases, in box 192, the counter CLN by one (1). Then, the control unit 54 determines in interrogation box 194 whether the content of counter CLN is greater than Nc. If the interrogation in box 194 results in negative, the control unit returns to the start point and waits from the next occurrence of interruption. Since the fuel injection timer is not set, the expected fuel injection is suspended. Since Nc has been set to three (3) and Ni to two (2) in box 128 of the control routine of FIG. 3, the fuel injection is suspended three times consecutively until the content of counter CLN exceeds Nc (=3). When the content of counter CLN amounts to four (4) after increment in box 192, the interrogation in box 194 results in affirmative. Thus, the control unit 54 determines in interrogation box 196 whether the content of CLN is less than or equal to the sum of Nc+Ni (=5 in this case). If this is the case, the control unit 54 sets, in box 198, fuel injection timer. Then, if the interrogation in the next box 200 is affirmative, the control unit 54 sets the ignition timer in box 202. Thus, the fuel injection with a fuel injection pulse width Ti is effected and followed by production of spark at the spark timing θ. The fuel injection followed by the production of spark is effected two times since Ni is set to 2. If the interrogation in box 196 results in negative, the control unit 54 resets, in box 204, the counter CLN to zero (0). From the above description along with FIG. 6, it is now understood that the fuel injection is suspended three times and then the fuel injection is effected two times.

In general expression, the fuel injection is suspended Nc times consecutively and fuel injection is effected Ni times consecutively. Since the sum of Nc and Ni fails to agree with the total number of cylinders of an engine and a divisor of the total number, either, each of the engine cylinders is disabled at regular internals during split cylinder operation. Thus, the heat is evenly distributed over the whole engine cylinders during split cylinder operation.

Since, during split cylinder operation, the mixture enrichment correction Ti* is suspended, the temperature of exhaust gas is held to a satisfactorily low level. The three-way catalytic converter 48 in the exhaust system 46 is free from thermal damage.

According to the split cylinder operation in preceding description, the fuel injection is suspended three times and the fuel injection is effected two times. In order to suppress occurrence of surge, it is possible to suspend fuel injection consecutively two times, and effect fuel injection one time, and suspend fuel injection one time and then effect fuel injection one time.

According to the embodiment, since the spark advance is retarded during split cylinder operation, the occurrence of knock is eliminated or at least minimized.

What is claimed is:

1. A method of a traction control for an automotive vehicle having a multi-cylinder internal combustion engine, a pair of driving wheels driven by the engine, and a pair of non-driving wheels, wherein the engine shifts to effect a split cylinder operation in response to an occurrence of a wheel slip of the driving wheels, and wherein a first mixture on which the engine operates is subject to mixture enrichment as a second mixture, the method comprising the step of:

disabling each of the engine cylinders at intervals during the split cylinder operation wherein heat is distributed evenly over the entire engine cylinders; and effecting the split cylinder operation on said first mixture which is free from the mixture enrichment.

2. A method of a traction control for an automotive vehicle having a multi-cylinder internal combustion engine, a pair of driving wheels driven by the engine, and a pair of non-driving wheels, wherein the engine shifts to effect a split cylinder operation in response to an occurrence of a wheel slip of the driving wheels, and wherein a first mixture on which the engine operates is subject to mixture enrichment as a second mixture, the method comprising the steps of:

during the split cylinder operation, disabling each of the engine cylinders at intervals, wherein, during said intervals, heat is distributed evenly over the entire engine cylinders and the split cylinder operation is effected on said first mixture which is free from the mixture enrichment; and during time periods not corresponding to when the vehicle is in the split cylinder operation, subjecting the engine to the second mixture.

3. A method as claimed in claim 2, wherein the engine effects the split cylinder operation on a spark timing retarded than a spark timing on which the engine operates normally.

4. A method as claimed in claim 2, further comprising the step of providing the mixture enrichment to the engine when the vehicle is operating in a normal, non-traction control mode and is not operating in the split cylinder operation.

5. A method as claimed in claim 2, wherein the multi-cylinder internal combustion engine consists of n cylinders, n being an integer greater than one, the method further comprising the step of:

during the split cylinder operation, dividing a time period in which the vehicle is in the split cylinder operation into consecutive time intervals corresponding to a value not equal to n and not equal to an integer divisor of n, wherein said each of the engine cylinders is repeatedly disabled and enabled at a predetermined sequence during the consecutive time intervals corresponding to the value not equal to n and not equal to an integer divisor of n.

6. A method as claimed in claim 5, wherein during the split cylinder operation, said each of the engine cylinders is disabled for a first consecutive number of intervals, and said each of the engine cylinders is enabled for a second consecutive number of intervals that occur consecutively after said first consecutive number of intervals have elapsed, and wherein a sum of said first consecutive number of intervals and said second consecutive number of intervals is equal to the number of intervals corresponding to the value not equal to n and not equal to an integer divisor of n.

7. A system for a traction control for an automotive vehicle having a multi-cylinder internal combustion engine, a pair of driving wheels driven by the engine, and a pair of non-driving wheels, wherein the engine shifts to effect a split cylinder operation in response to an occurrence of a wheel slip of the driving wheels, and wherein a first mixture on which the engine operates is subject to mixture enrichment as a second mixture, comprising:

means for disabling each of the engine cylinders at intervals during the split cylinder operation, wherein, during said intervals, heat is distributed evenly over the entire engine cylinders and the split cylinder operation is effected on said first mixture which is free from the mixture enrichment; and means for subjecting the engine to the second mixture during time periods not corresponding to when the vehicle is in the split cylinder operation.

8. A system as claimed in claim 7, wherein the engine effects the split cylinder operation on a spark timing retarded than a spark timing on which the engine operates normally.

9. A system as claimed in claim 7, further comprising means for providing the mixture enrichment to the engine when the vehicle is operating in a normal, non-traction control mode and is not operating in the split cylinder operation.

10. A system as claimed in claim 7, wherein the multi-cylinder internal combustion engine consists of n cylinders, n being an integer greater than one, the system further comprising:

means for dividing a time period in which the vehicle is in the split cylinder operation into consecutive time intervals corresponding to a value not equal to n and not equal to an integer divisor of n, wherein said each of the engine cylinders is repeatedly disabled and enabled at a predetermined sequence during the consecutive time intervals corresponding to the value not equal to n and not equal to an integer divisor of n.

11. A system as claimed in claim 10, wherein during the split cylinder operation, said each of the engine cylinders is disabled for a first consecutive number of intervals, and said each of the engine cylinders is enabled for a second consecutive number of intervals that occur consecutively after said first consecutive number of intervals have elapsed, and wherein a sum of said first consecutive number of intervals and said second consecutive number of intervals is equal to the number of intervals corresponding to the value not equal to n and not equal to an integer divisor of n.

\* \* \* \* \*